H. M. P. MURPHY.
LEAK OBVIATING MEANS FOR PISTONS.
APPLICATION FILED MAR. 21, 1908.
912,713.
Patented Feb. 16, 1909.
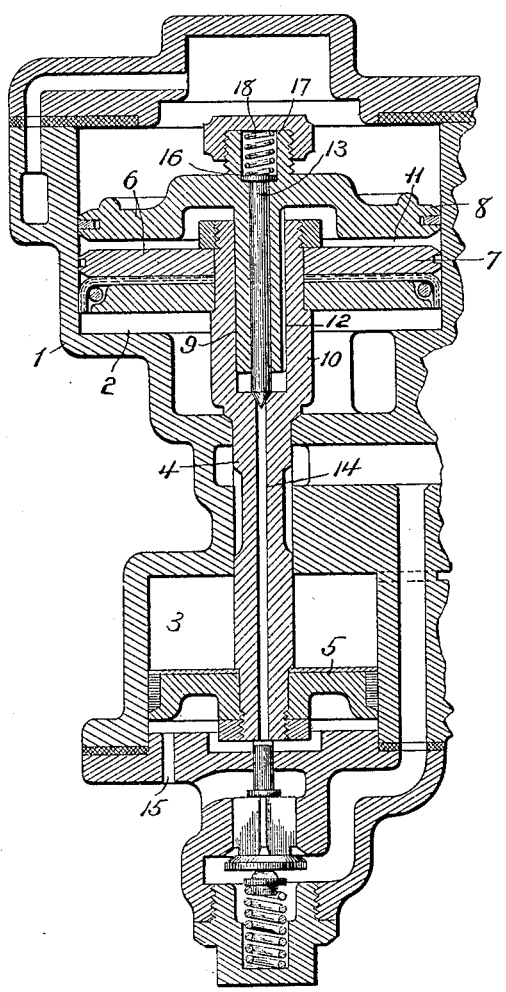
WITNESSES
INVENTOR
H. M. P. Murphy
By H. A. Seymour
Attorney

UNITED STATES PATENT OFFICE.

HOWARD M. P. MURPHY, OF PITTSBURG, PENNSYLVANIA, ASSIGNOR OF ONE-FOURTH TO L. H. BOWMAN, OF MUNHALL, PENNSYLVANIA, AND ONE-EIGHTH TO JOSEPH M. FLANNERY, OF PITTSBURG, PENNSYLVANIA.

LEAK-OBVIATING MEANS FOR PISTONS.

No. 912,713.           Specification of Letters Patent.           Patented Feb. 16, 1909.

Application filed March 21, 1908. Serial No. 422,535.

*To all whom it may concern:*

Be it known that I, HOWARD M. P. MURPHY, a resident of Pittsburg, in the county of Allegheny and State of Pennsylvania, have invented certain new and useful Improvements in Leak-Obviating Means for Pistons; and I do hereby declare the following to be a full, clear, and exact description of the invention, such as will enable others skilled in the art to which it appertains to make and use the same.

My invention relates to leak obviating means for pistons, and more particularly to means for preventing leakage of fluid from one side to the other of a piston contained within a cylinder or chamber containing fluid under different degrees of pressure on respective sides of the piston.

The object of the invention is to provide simple and efficient means whereby any fluid which might tend to leak past a piston on account of deterioration of the piston packing or from other cause, will be arrested and discharged to the atmosphere (or to a low pressure chamber) thus preventing fluid from passing by leakage from one side of the piston to the other.

With this object in view, the invention consists in certain novel features of construction and combination of parts as hereinafter set forth and pointed out in the claims.

The accompanying drawing is a sectional view of a portion of an air brake valve mechanism, showing an embodiment of my invention.

While my improvements are applicable for use in any machine or device in which it is desirable to guard against leakage of fluid past a piston from one portion to another of the cylinder or chamber in which said piston is contained,—still in order that the invention shall be clearly understood, I have shown it in the drawings and will hereinafter describe it as applied to a portion of an air brake valve mechanism.

1 represents a casing containing two chambers 2—3 connected by a passage through which a rod 4 passes. This rod carries a piston 5 at its lower end located in the chamber 3, and at its upper end, said rod is provided with a two-part piston 6. In the construction shown, the chamber 2 is intended to receive fluid under different pressures at respective sides of the piston,—viz.—fluid under train pipe pressure above the piston and fluid under main reservoir or supply pressure below said piston. It is to prevent the leakage of high pressure fluid past this piston to the low pressure side of the latter, that my improvements are provided.

As before intimated, the chamber 2 contains a two-part piston. That is to say,— the piston 6 comprises two members 7—8 the member 7 being rigidly secured to the rod 4 and the member 8 adapted to have a slight movement independently thereof. The member 8 is provided with a tubular stem 9 movable in the tubular upper portion 10 of the rod 4 and the space 11 between the piston members 7—8 is connected with the tubular portion 10 of the rod 4 below the stem 9, by means of a duct 12 in said stem. A valve rod 13 passes through the tubular stem 9, and the lower end of this valve rod closes a duct 14 in the rod 4. Through this duct and the duct 12 in the tubular stem 9, any excess of air leaking between the piston members 7—8 may pass to the chamber 3 and thence by way of a duct 15 to the atmosphere. The upper end of the valve rod 13 is provided with a head 16 disposed within a small chamber 17 on the piston member 8, and within this chamber, a small spring 18 is located and presses upon the head 16 of valve rod 13 with a light force, thus preventing said valve rod 13 from being forced against its seat with a damaging pressure when the piston members 7—8 are forced close together.

Assume now, that the packing of piston member 7 should leak, and that the pressure above the piston member 8 is lower than the pressure below the piston member 7. Under these conditions, pressure in the space 11 between the piston members will begin to build up above that in the upper part of chamber 2, and the member 8 of the piston will move upwardly and unseat the valve 13—thus permitting the excess of fluid to pass through duct 12 and the tubular upper end 10 of rod 4, and thence through the duct 14 to the lower portion of chamber 3, and finally through the duct 15 to the atmosphere.

Throughout the operations of the device shown in the drawings, the piston member 8 will remain balanced as any excess of pressure in the space 11 will be vented by the valve 12, and any leak of pressure in said space, will be quickly supplied by leakage past the packing ring of piston member 8 as the space 17 is very small. It is clear therefore, that when the packing of piston member 7 is perfect, the device will operate precisely as it would if the piston member 8 were removed and the duct 14 closed by a plug.

Slight changes might be made in the details of construction of my invention without departing from the spirit thereof or limiting its scope, and hence I do not wish to restrict myself to the precise details herein set forth.

Having fully described my invention what I claim as new and desire to secure by Letters-Patent, is:—

1. In a device of the character described, the combination with a piston comprising two members forming a chamber between them, of means for venting fluid from the chamber between said piston members.

2. A device of the character described, comprising two piston members one movable relatively to the other, and valved means controlled by the movable member for venting fluid from between said piston members.

3. In a device of the character described, the combination with a piston comprising two members, one movable relatively to the other, of a rod secured to one of said piston members, ducts leading from the space between the piston members for exhausting fluid from said space, and a valve connected with the movable piston member for controlling the exhaust of fluid through said ducts from the space between the piston members.

4. In a device of the character described, the combination with a piston comprising two members, of a rod secured to one of the piston members and having a tubular portion and also having a discharge duct, a tubular stem on the other piston member and movable in the tubular portion of said rod, and a valve rod passing through and movable with said tubular stem for closing the duct in said rod.

5. A device of the character described, comprising two piston members, a rod secured to one piston member and having a tubular portion communicating with the space between the piston members, said rod also having a discharge duct communicating with said tubular portion, a tubular stem projecting from the other piston member and movable in the tubular portion of said rod, a valve rod passing through said tubular stem and movable therewith for opening and closing the duct in the rod to control the discharge of fluid from the space between the piston members and a spring behind said valve rod.

In testimony whereof, I have signed this specification in the presence of two subscribing witnesses.

HOWARD M. P. MURPHY.

Witnesses:
A. N. MITCHELL,
R. S. FERGUSON.